United States Patent
Bartels et al.

(10) Patent No.: US 9,463,799 B1
(45) Date of Patent: Oct. 11, 2016

(54) CONTROL FOR A HIGH OR FULLY AUTOMATIC DRIVING FUNCTION

(71) Applicants: VOLKSWAGEN AG, Wolfsburg (DE); AUDI AG, Ingolstadt (DE)

(72) Inventors: Arne Bartels, Wolfsburg (DE); Eckart Donner, Ingolstadt (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/795,393

(22) Filed: Jul. 9, 2015

(51) Int. Cl.
| | |
|---|---|
| *B60W 30/16* | (2012.01) |
| *B60W 30/12* | (2006.01) |
| *G05D 1/02* | (2006.01) |
| *G01C 21/28* | (2006.01) |
| *G08G 1/0965* | (2006.01) |

(52) U.S. Cl.
CPC .............. *B60W 30/16* (2013.01); *B60W 30/12* (2013.01); *G01C 21/28* (2013.01); *G05D 1/0276* (2013.01); *G05D 1/0289* (2013.01)

(58) Field of Classification Search
CPC .. B60W 30/16; B60W 40/04; B60W 40/105; G05D 1/02; G08G 1/0965
USPC ................................ 701/23, 36, 96; 340/988
See application file for complete search history.

(56) References Cited

U.S. PATENT DOCUMENTS

| | | | |
|---|---|---|---|
| 2014/0176350 A1* | 6/2014 | Niehsen ............... | B62D 15/025 340/988 |
| 2015/0006056 A1* | 1/2015 | Fairgrieve ............. | B60W 30/16 701/96 |
| 2015/0210290 A1* | 7/2015 | Hemes ................ | B60W 50/082 701/36 |

FOREIGN PATENT DOCUMENTS

| | | |
|---|---|---|
| DE | 10020742 A1 | 1/2001 |
| DE | 102007024877 A1 | 12/2008 |
| DE | 102012212681 A1 | 1/2013 |
| DE | 102011080922 A1 | 2/2013 |

* cited by examiner

*Primary Examiner* — Tan Q Nguyen
(74) *Attorney, Agent, or Firm* — Barnes & Thornburg LLP

(57) ABSTRACT

A method and apparatus for controlling a highly automatic or fully automatic driving function of a motor vehicle that is traveling. The method and apparatus determines the position, speed and direction of travel of the motor vehicle; receives driving data from further vehicles surrounding the motor vehicle; evaluates the received driving data from the further vehicles with respect to position and direction of travel to ascertain vehicles that are traveling ahead; compares the vehicle speeds of the ascertained vehicles that are traveling ahead with a prescribed speed range based on the speed of the motor vehicle; approves or prevents activation of the highly automatic or fully automatic driving function based on the speeds of the vehicles that are traveling ahead.

9 Claims, 1 Drawing Sheet

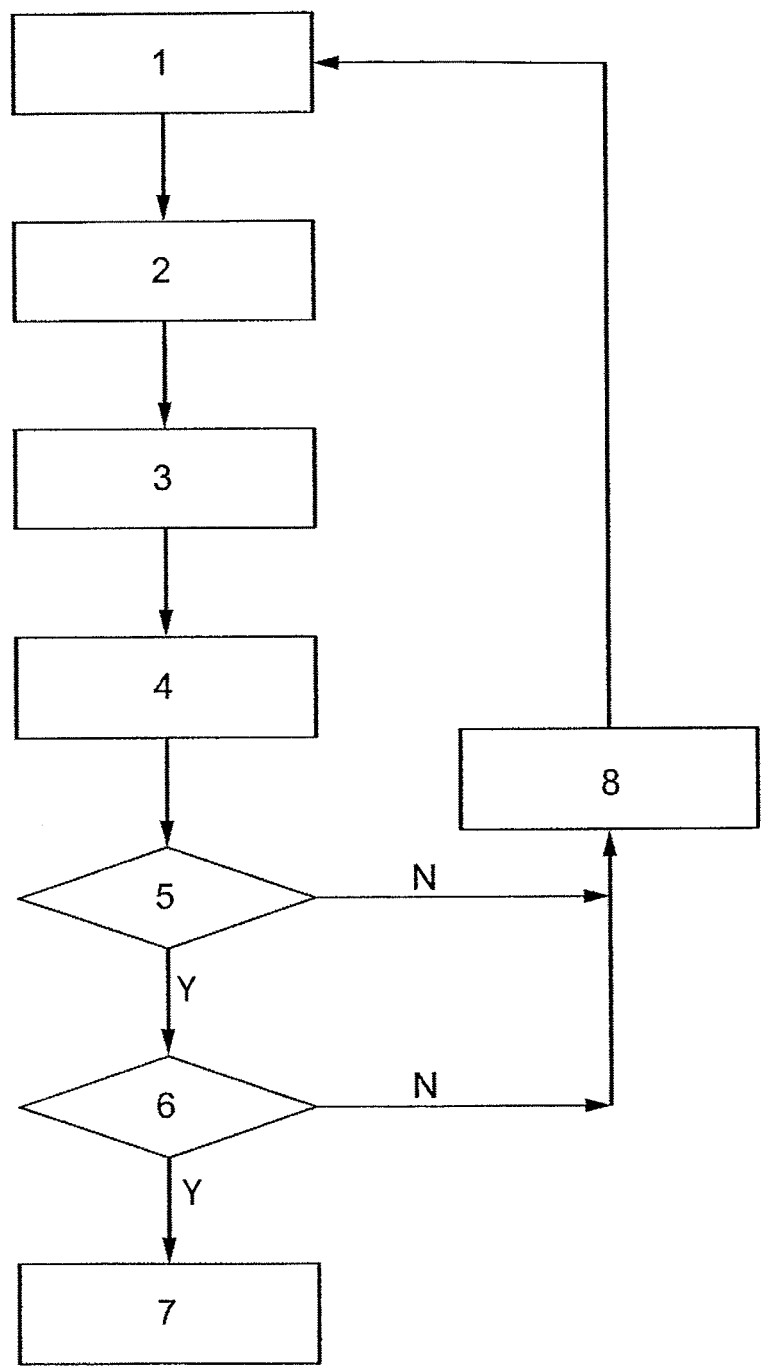

CONTROL FOR A HIGH OR FULLY AUTOMATIC DRIVING FUNCTION

PRIORITY CLAIM

This patent application claims priority to German Patent Application No. 10 2014 202 509.5, filed 12 Feb. 2014, the disclosure of which is incorporated herein by reference in its entirety.

SUMMARY

Illustrative embodiments relate to a method for controlling a highly automatic or fully automatic driving function of a motor vehicle.

Illustrative embodiments ensure road safety when a highly automatic or fully automatic driving function is activated at high speed.

Illustrative embodiments provide a method for controlling a highly automatic or fully automatic driving function of a motor vehicle and a corresponding apparatus.

BRIEF DESCRIPTION OF THE DRAWINGS

A disclosed embodiment is explained below with reference to the single drawing, in which:

FIG. 1 shows a block diagram of the apparatus from which the method sequence is evident.

DETAILED DESCRIPTION OF THE DISCLOSED EMBODIMENTS

The method for controlling a highly automatic or fully automatic driving function of a motor vehicle that is on a journey has the following steps:

- determination of the position, speed and direction of travel of the motor vehicle,
- reception of driving data from further vehicles in the surroundings of the motor vehicle by means of vehicle-to-vehicle communication and/or vehicle-to-infrastructure communication, wherein the driving data from the further vehicles comprise at least the respective vehicle speed, position and direction of travel of the further vehicles,
- evaluation of the received driving data from the further vehicles with respect to position and direction of travel to ascertain vehicles that are traveling ahead,
- comparison of the vehicle speeds of the ascertained vehicles that are traveling ahead with a prescribed speed range based on the speed of the motor vehicle,
- approval of activation of the highly automatic or fully automatic driving function if the speeds of the vehicles that are traveling ahead are within the prescribed speed range, and
- prevention of activation of the highly automatic or fully automatic driving function when the speed of at least one of the vehicles that are traveling ahead is outside, particularly below, the prescribed speed range.

So that a highly automatic or fully automatic driving function can be activated for high-speed travel on a freeway, for example, it is necessary to ensure that the route ahead is negotiable and obstacle-free. To this end, vehicles traveling ahead transmit driving data, such as at least position, speed and direction of travel, to the ego vehicle. If the vehicles traveling ahead travel approximately at the desired speed of the ego vehicle for the intended automatic driving mode, it is possible for the automatic driving mode to be activated. If the vehicles traveling ahead are much slower than the desired speed of the ego vehicle for the automatic driving mode at high speed, activation is not possible. The driving data from the vehicles traveling ahead are transmitted to the ego vehicle either by means of vehicle-to-vehicle communication, also referred to as V2V communication, and/or by means of vehicle-to-infrastructure communication, also referred to as V2I communication.

Optionally, the vehicles that are traveling ahead are meant to be within a prescribed distance from the motor vehicle. In other words, if the ascertained vehicles traveling ahead are far enough away from the ego vehicle, the information from them is ignored. In this case, the distance from which no vehicles traveling ahead are taken into account is a function of the current speed or the desired speed of the ego vehicle. By way of example, all vehicles traveling ahead that are at a time interval of more than 5 minutes can be ignored.

Optionally, activation of the highly automatic or fully automatic driving function is prevented if no vehicle traveling ahead is ascertained within a prescribed period. If there are therefore no vehicles traveling ahead, this means free driving on a freeway, for example. Since not all vehicles currently have the possibility of vehicle-to-vehicle communication or vehicle-to-infrastructure communication, however, it is possible that the route section ahead contains at least one further vehicle that cannot be sensed. If no vehicle traveling ahead is sensed in a route section ahead for a prescribed period, therefore, activation of the automatic driving function is blocked. By contrast, when vehicles traveling ahead are sensed, it is assumed that vehicles that cannot be sensed are also moving at the speed of the sensed vehicles traveling ahead and activation of the automatic driving function is possible under the conditions outlined above.

Optionally, in the case of multilane carriageways the position information is used to ascertain whether the vehicles traveling ahead are in the lane of the motor vehicle, and only the vehicles traveling ahead in the lane of the motor vehicle are taken into account for the admissibility of the activation of the highly automatic or fully automatic driving function. In this way, it is possible to limit the automatic driving function to the vehicle's own lane. This appears to make sense when, on a freeway, for example, trucks are traveling on the right and an automatic driving function is possible in the left-hand lane(s).

Optionally, the motor vehicle must have a minimum speed so that a check on the route ahead is performed by means of vehicle-to-vehicle communication or vehicle-to-infrastructure communication. Optionally, the minimum speed is 60 km/h, so that for all speeds of the ego vehicle above or equal to 60 km/h it is possible for the automatic driving function to be activated following a check on the method steps or for the activation thereof to be prevented. If the speed of the motor vehicle is lower than the minimum speed, on the other hand, then the driver can readily activate the relevant automatic driving function, since in this case, the route section ahead can be monitored using the vehicle's own ambient sensor system and it is not necessary for the traffic further ahead to be checked using external information.

The apparatus for controlling a highly automatic or fully automatic driving function of a motor vehicle that is on a journey, which apparatus is set up and designed to perform the method explained above, comprises:

- a device for determining the position, speed and direction of travel of the motor vehicle,
- a device for receiving driving data from further vehicles in the surroundings of the motor vehicle by means of vehicle-to-vehicle communication and/or vehicle-to-infrastructure communication, wherein the driving data from the further vehicles comprise at least the respective vehicle speed, position and direction of travel of the further vehicles, a device for evaluating the received driving data with respect to position and direction of travel to ascertain vehicles that are traveling ahead, a device for comparing the vehicle speeds of the vehicles that are traveling ahead by a prescribed speed range based on the speed of the motor vehicle, a device for activating the highly automatic or fully automatic driving function, wherein the corresponding driving function is activated if the speeds of the vehicles that are traveling ahead are within the prescribed speed range, and for blocking the corresponding driving function if the speed of at least one of the vehicles that are traveling ahead is outside, particularly below, the prescribed speed range.

Optionally, the apparatus comprises a device for ascertaining whether vehicles traveling ahead are sensed within a prescribed period. Should this not be the case, activation of the highly automatic or fully automatic driving function is prevented.

In contrast to platooning, the automatic driving function can be maintained if one of the vehicles traveling ahead leaves the freeway and a short successive distance is not required. In addition, highly automatic and fully automatic driving at high speeds is also possible outside the queue situation, which is not possible in the case of the queue pilot. Finally, the mode explained always ensures that the route ahead is negotiable without obstacles arising, such as much slower vehicles.

While the equipment of vehicles with V2V technology is merely in its infancy at present and therefore penetration in the field is currently very low, driving data via V2I communication are already extensively in place in the field. Examples of sources for these V2I driving data are navigation systems that are equipped with SIM cards for updating map data, mobile telephones carried in the vehicle and fixed sensors for monitoring traffic flow, such as induction loops, radars or cameras on bridges. In addition, the V2I or V2V route data can be transmitted by a plurality of vehicles traveling ahead.

FIG. 1 uses a schematic diagram to show the sequence of the method and the operation of the apparatus for controlling a highly automatic or fully automatic driving function of a motor vehicle that is on a journey.

After the driver of a motor vehicle, which is referred to as the ego vehicle below, has set activation of an automatic driving function in motion (not shown), for example by selecting an appropriate menu, the position, speed and direction of travel of the ego vehicle are determined in a first step 1.

In addition, the first step can check whether the motor vehicle is moving at a minimum speed. If the speed is below the minimum speed, the automatic driving function can be activated without the subsequent check if the onboard ambient sensors so permit (not shown).

Next, a second step 2 involves the driving data from further vehicles in the surroundings of the motor vehicle being received by the ego vehicle by means of vehicle-to-vehicle communication and/or vehicle-to-infrastructure communication. In this case, the driving data from the further vehicles comprise at least the respective vehicle speed, position and direction of travel thereof.

In a third step 3, those vehicles that are outside a prescribed physical range around the current position of the ego vehicle are eliminated, since these vehicles are not of interest to the remainder of the method owing to their distance from the ego vehicle. In this case, the physical range is a function of the desired speed of the ego vehicle for the automatic driving function or the current speed if this corresponds to the desired speed for the automatic driving function. This range can be expressed by an interval of time, which may be 5 minutes, for example.

In a fourth step 4, the received driving data from the further vehicles in the surroundings of the ego vehicle are evaluated in respect of position and direction of travel to ascertain vehicles traveling ahead. In other words, the large number of the transmitted positions of the further vehicles is used to form a subset of those further vehicles that are traveling ahead of the ego vehicle.

A fifth step 5 ascertains whether data have been received from vehicles traveling ahead within a prescribed period at all. In other words, an investigation is performed to determine whether the route section ahead of the position of the ego vehicle contains vehicles traveling ahead that communicate with the ego vehicle. If this is not the case, the highly automatic or fully automatic driving function is blocked in a blocking step 8. This is necessary because it cannot be ruled out that the route section ahead beyond the range of the onboard sensors contains a vehicle that does not have communication capability and that has a lower speed than the desired speed.

In a comparison step 6, the vehicle speeds of the vehicles traveling ahead are compared with a prescribed speed range based on the speed of the motor vehicle taking account of the dedicated vehicle ambient sensor system. In this case, the speed range can be formed in customary fashion by a prescribed speed environment around the current speed of the ego vehicle or the desired speed of travel of the ego vehicle in the automatic driving mode. In other words, if the desired speed is meant to be 130 km/h, for example, the speed range in which the vehicles traveling ahead must move may be at a range from 80 km/h to 180 km/h.

If all speeds of the vehicles traveling ahead are within the speed range described above, the desired highly automatic or fully automatic driving function is activated in the next step 7.

If this is not the case and at least one speed of a vehicle traveling ahead is below the speed range, then the corresponding automatic driving function is blocked by the blocking step 8.

Highly automatic and/or fully automatic driving functions that allow the driver to perform additional activities are the subject of current research projects. With a highly automatic driving function, the driver has the function of a monitoring entity. Although he can carry out additional activities when the highly automatic driving function is activated, he must be potentially capable of taking over control of the vehicle again, so that the term "piloted driving" appears to become established for highly automatic driving. By contrast, fully automatic driving involves the vehicle traveling autonomously and without the influence of the driver.

At least three different approaches are pursued in this context:

The vehicles travel at high speed and are in a convoy with a short successive distance, also called a platoon. By way of example, this has been demonstrated in the EU-funded project Sartre (http://www.sartre-project.eu/en/Sidor/default.aspx), in which the possibility of performing additional activities in the subsequent vehicles has been explicitly highlighted. One of the basic assumptions of this method is that the vehicle traveling in front ensures that the route is negotiable. A drawback of this method is that the vehicles behind follow the vehicle in front at a very short distance, which at least requires familiarization or is uncomfortable, particularly at high speeds. The automatic successive driving then needs to be terminated if the vehicle traveling ahead leaves the freeway at an exit, for example. In addition, the legal constraints for the driving with an "electronic drawbar" will not be in place for the foreseeable future.

The second approach relates to automatic successive driving in a queue, which is usually referred to as queue pilot. The result of a queue situation is that a vehicle traveling ahead is existent and the successive driving of the ego vehicle is effected at low speed in relation to the vehicle traveling ahead. The automatic successive driving is necessarily terminated when the queue breaks up, since this automatic driving function is not available outside a queue situation.

The third approach relates to automatic driving, particularly on freeways, at high speeds of, by way of example, 130 km/h and above. The route forecast to answer the question of whether the route is negotiable is made in this case using dedicated vehicle sensors, such as radar, camera or laser. Further ambient information can be obtained by means of communication between vehicles (V2V—Vehicle to Vehicle) or communication between vehicles and an infrastructure such as a traffic information service (V2I—Vehicle to Infrastructure). However, the range of the dedicated vehicle sensors is limited to a few hundred meters, which makes comfortable braking, for example ahead of static obstacles, more difficult particularly at high speeds. In addition, the still restricted penetration of V2V or V2I technology into the total vehicle fleet must be taken into account, which means that in the worst case there are no driving data available from a vehicle traveling ahead. In other words, it is not possible to react comfortably to vehicles with a low speed or even stationary vehicles, as at the end of the queue.

Thus, the document DE 10 2012 212 681 A1 discloses a method for autonomously guiding vehicles traveling along a route, wherein a guiding vehicle is in communication with at least one following vehicle. Communication takes place between guiding vehicle and following vehicle in relation to target offset position and route data. In addition, tracking data are produced and by onboard sensing apparatuses of the at least one following vehicle, which contain the path covered by the guiding vehicle, which path is sensed by the at least one following vehicle, wherein the route data are compared with the tracking data to determine whether they match. A selected target offset position and a set of trajectory end points that provides a trajectory route from a current position of the at least one following vehicle to the selected target offset position are determined on the basis of the match between the route data and the tracking data.

The document DE 100 20 742 A1 describes a convoy travel control apparatus that allows convoy travel with a guiding vehicle driven by a driver and a plurality of following vehicles that automatically follow the guiding vehicle. Each of the vehicles comprises an input apparatus for inputting the total number of vehicles in a convoy and the sequential number of each vehicle in the convoy; a vehicle setting apparatus for setting each vehicle either as a guiding vehicle or as a following vehicle according to the sequential number of each vehicle in the convoy in accordance with the input using the input apparatus; and a vehicle driving control apparatus for instructing each vehicle to drive in convoy in accordance with the set sequential number in the convoy. This allows a convoy or the like to be formed outside stations too.

The document DE 10 2007 024 877 A1 reveals a method for controlling vehicles in a platoon of vehicles or for forming a platoon of vehicles. The platoon of vehicles can be accepted by means of a two-stage acceptance method, driving movements planned for the future can be coordinated and, additionally, surrounding vehicles can be informed about the existing platoon of vehicles and/or the planned driving movements of the platoon of vehicles.

The document DE 10 2011 080 922 A1 discloses predictive ascertainment of an expected trajectory profile for reproducing a dynamic state of the ego vehicle for surrounding vehicles and the standardized transmission thereof using a vehicle-to-vehicle communication system. In this case, the trajectory profile is made available, particularly as an explicitly parameterized trajectory, for adjacent vehicles, which likewise need to be equipped with an appropriate vehicle-to-vehicle communication system. From a mathematical point of view, only the parameters of the trajectory profiles that can be expected may be transmitted for bandwidth optimization, it being advantageous both for lane-related relevance checking and for distance-related relevance checking to transmit the absolute positions as well.

LIST OF REFERENCE SYMBOLS

1 Determination of prescribed parameters of the ego vehicle
2 Reception of prescribed parameters from further vehicles
3 Selection of the vehicle position of the further vehicles
4 Selection of vehicles traveling ahead
5 Test "Are there vehicles ahead?"
6 Test "Speed check for vehicles traveling ahead"
7 Activation of the automatic driving function
8 Blocking of the automatic driving function

The invention claimed is:

1. A method for controlling a highly automatic or fully automatic driving function for a motor vehicle that is on a journey, the method comprising:
   determining the position, speed and direction of travel of the motor vehicle;
   receiving driving data from further vehicles in the surroundings of the motor vehicle by vehicle-to-vehicle communication and/or vehicle-to-infrastructure communication, wherein the driving data from the further vehicles comprise at least the respective vehicle speed, position and direction of travel of said further vehicles;
   evaluating the received driving data with respect to position and direction of travel to ascertain vehicles that are traveling ahead;
   comparing the vehicle speeds of the vehicles that are traveling ahead with a prescribed speed range based on the speed of the motor vehicle;
   approving activation of the highly automatic or fully automatic driving function if the speeds of the vehicles that are traveling ahead are within the prescribed speed range; and
   preventing activation of the highly automatic or fully automatic driving function when the speeds of at least one of the vehicles that are traveling ahead is outside the prescribed speed range.

2. The method of claim 1, wherein a selection is made from those vehicles traveling ahead that are within a prescribed distance from the motor vehicle.

3. The method of claim 1, wherein a check is performed to determine whether no vehicle traveling ahead is ascertained within a prescribed period, and activation of the highly automatic or fully automatic driving function is prevented if no vehicle traveling ahead is ascertained within the prescribed period.

4. The method of claim 1, wherein, in the case of multilane carriageways, the position information is used to ascertain whether the vehicles traveling ahead are in the lane of the motor vehicle, and only the vehicles traveling ahead in the lane of the motor vehicle are taken into account for the admissibility of the activation of the highly automatic or fully automatic driving function.

5. The method of claim 1, wherein the motor vehicle has a minimum speed.

6. The method of claim 5, wherein the minimum speed is 60 km/h.

7. An apparatus for controlling a highly automatic or fully automatic driving function of a motor vehicle that is on a journey, which apparatus is set up and designed to perform the method of claim 1, the apparatus comprising:
- a device for determining the position, speed and direction of travel of the motor vehicle;
- a device for receiving driving data from further vehicles in the surroundings of the motor vehicle by vehicle-to-vehicle communication and/or vehicle-to-infrastructure communication, wherein the driving data from the further vehicles comprise at least the respective vehicle speed, position and direction of travel of said further vehicles;
- a device for evaluating the received driving data with respect to position and direction of travel to ascertain vehicles that are traveling ahead;
- a device for comparing the vehicle speeds of the vehicles that are traveling ahead by a prescribed speed range based on the speed of the motor vehicle; and
- a device for activating the highly automatic or fully automatic driving function, wherein the corresponding driving function is activated if the speeds of the vehicles that are traveling ahead are within the prescribed speed range, and for blocking the corresponding driving function if the speeds of at least one of the vehicles that are traveling ahead is outside, particularly below, the prescribed speed range.

8. The apparatus of claim 7, further comprising a device for ascertaining vehicles traveling ahead within a prescribed period, wherein the highly automatic or fully automatic driving function is blocked if no vehicle traveling ahead is ascertained within the prescribed period.

9. The apparatus of claim 7, further comprising a device for selecting those vehicles traveling ahead that are within a prescribed distance from the motor vehicle.

* * * * *